United States Patent Office 3,235,530
Patented Feb. 15, 1966

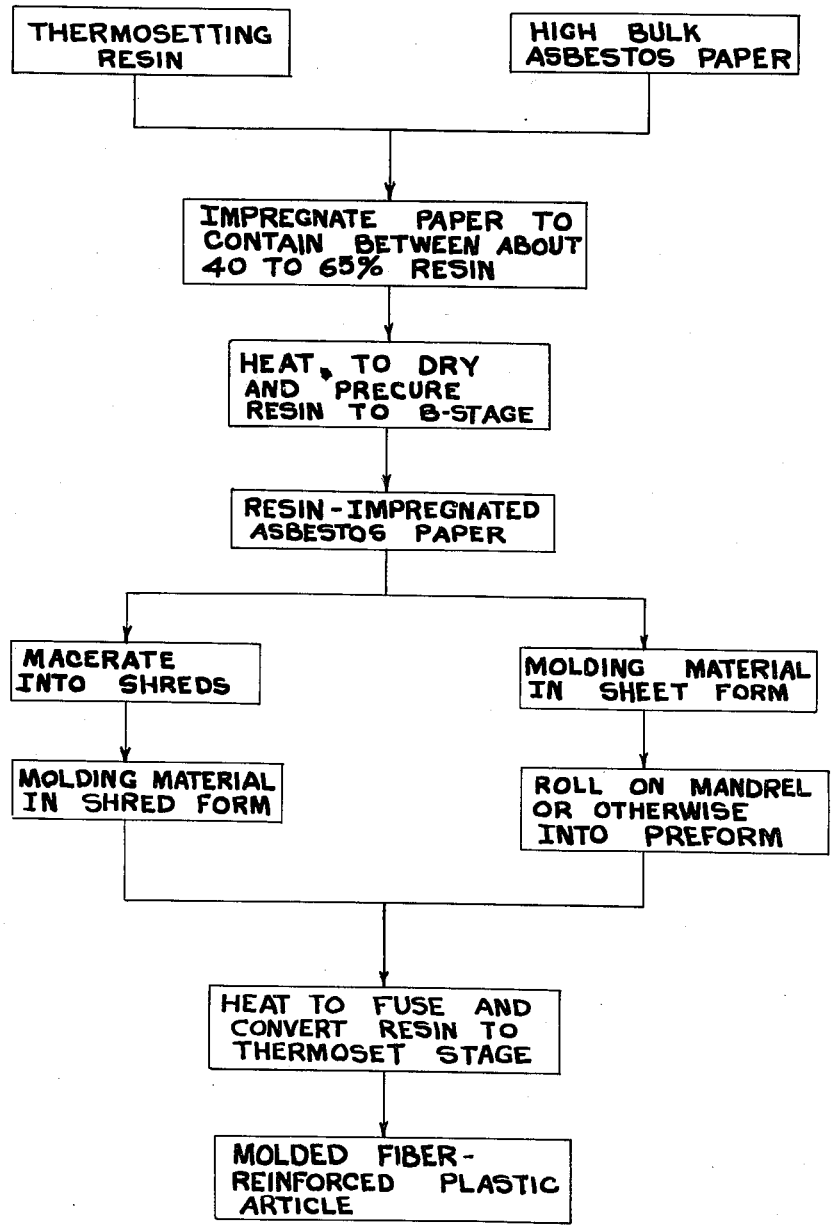

3,235,530
ASBESTOS FIBER REINFORCED MOLDING MATERIAL, MOLDED ARTICLES AND METHODS OF MAKING SAME
Robert T. Crouch, Middlesex, and Charles H. Barger, Nixon, N.J., assignors to Johns-Manville Corporation, New York, N.Y., a corporation of New York
Filed Oct. 6, 1960, Ser. No. 55,924
15 Claims. (Cl. 260—37)

This invention relates to fiber-reinforced molded plastic articles, molding materials from which such plastic articles may be produced, methods for the preparation of such molding materials, and processes for forming the new fiber-reinforced molded plastic articles. The term, articles, as used in the specification and claims includes pipe fittings, pipe couplings and any other elements which are normally associated with the general use of hollow cylinders or tubes such as pipe for the conduction of fluids. More particularly, the invention is concerned with molded plastic articles which are reinforced with asbestos fibers made from molding materials which enable the plastic articles to be produced so that they possess a homogeneous structure, excellent strength and other good physical properties. The invention is especially concerned with the formation of fiber-reinforced plastic pipe which is of homogeneous construction, possesses relatively smooth inner and outer wall surfaces, is substantially free of seepage of liquids through the walls when the pipe contains liquids under hydrostatic pressure so as to be in effect fluid opaque, and which is capable of being mechanically threaded with standard pipe threading equipment.

This application is a continuation-in-part of U.S. application Serial No. 847,419, filed October 19, 1959, now abandoned.

FIELD OF INVENTION

It is common practice to incorporate various filling materials in molding compositions made of thermosetting resins, so that the strength and other physical characteristics of articles molded from the resin compositions may be suitably controlled or modified. It is likewise well known to incorporate into molded plastic articles, glass fibers, asbestos fibers, synthetic filaments or similar filaments to reinforce the resulting articles and provide greater tensile, flexure and other strengths to the molded articles than could be obtained from the unreinforced plastic material.

Because of the low density and high degree of corrosion resistance possessed by many plastic materials, both thermoplastic and thermosetting resins have been employed to a considerable extent for the production of plastic tubing and pipe. As a result, it has been possible to form pipe and tubing which is much lighter in weight and considerably more resistant to corrosion by many fluids than is possible with pipe or tubing fabricated from metals. On the other hand, the available plastic materials from which pipe can be made commercially present serious limitations on the structural strength of the pipe or tubing made from such plastics. Accordingly, in order to increase the structural strength of the plastic pipe and make it competitive in this respect to metal pipe or tubing, it has been necessary to devise materials and methods by which reinforcing fibers or other elements may be incorporated in the plastic pipe.

Incorporation of reinforcing fibers in plastic tubular sections has been accomplished heretofore in a number of different ways. For example, it is possible to form a tubular section of reinforcing fibers from woven fiber cloth or roving, place the resulting fiber tube in a centrifugal casting mold, introduce suitable plastic forming material into the mold, and then subject the mold and its contents to suitable conditions to form a centrifugally cast fiber-reinforced plastic pipe. Such pipe forming methods are disclosed, for example, in U.S. Patents 2,785,442 and 2,790,997.

Another method of forming fiber reinforced plastic pipe is to wind woven fabric or non-woven fibers onto a mandrel, impregnate the wound fibers with plastic material such as by spraying, brushing or the like, and then to subject the mandrel and the encasing fibers and impregnated plastic to suitable curing conditions to form the final pipe. The mandrel winding method of forming plastic pipe is disclosed, for example, in U.S. Patents 2,467,999, 2,614,058 and 2,785,442.

Yet another basic method is available for forming tubing or pipe from plastic materials incorporating reinforcing fibers. This involves the formation of a web, either woven or non-woven, from suitable reinforcing filaments, impregnating the self-supporting web with a resinous material, assembling the resulting impregnated fiber web upon a mandrel or other suitable form, and then subjecting the resulting structure to the necessary pressure and temperature conditions required to fuse together and cure the resin impregnant of the separate layers of the formed fiber web into a solid integral matrix incorporating the reinforcing fibers. This third basic method of plastic tube production is used in the procedures disclosed in U.S. Patents 2,803,576 and 2,854,031.

Although the methods for forming plastic pipe, as described above, and yet others, have been known for some time, the potential market for the sale of strong fiber reinforced plastic pipe is far from being adequately supplied because of the difficulties and costs encountered in the present known methods for the production of plastic pipe. Thus, although the various manufacturing procedures as described above are theoretically sound, their use for the formation of plastic pipe involves certain serious complications. For example, incorporation of reinforcing fibers in the pipe structure has the tendency to create tiny pin holes through which liquid contained under pressure within the pipe will slowly seep. In the trade, this is referred to generally as "weeping." Such defect in plastic pipe makes it unsuitable for a large number of its intended uses.

Various expedients have been attempted to eliminate the weeping problem in fiber reinforced plastic pipe. For example, it is known to incorporate non-fibrous layers or liners within the pipe interior to create a barrier to contain liquids against possible seepage through any pin holes which may exist in the outer strata of the plastic pipe. In the centrifugal casting method of pipe formation as described above, this may be accomplished by introducing an excess of resinous material into the centrifugal mold so that a layer of unfilled plastic accumulates at the center of the pipe during its formation to create a fiber-free interior strata or layer. On the other hand, non-fibrous liners can be formed in the other described methods of pipe formation by first winding onto the forming mandrel a non-fibrous sheet or web of suitable plastic material and thereafter winding on the desired fiber convolutions which ultimately constitute the outer strata of the resulting pipe. Such methods of overcoming the weeping problem are not entirely satisfactory, however, because they produce a non-homogeneous construction in the pipe which may reduce the strength characteristics of the pipe or may create blistering or delamination within the pipe during its use.

Another problem connected with the sale and use of fiber reinforced plastic pipe involves connection of suitable coupling elements such as elbows, nipples or the like to the pipe. The fibers which are included in some plastic pipe make it impossible to form suitable threads in the ends of the pipe so that threaded couplings can be connected thereto. This disadvantage has been solved in connection with some plastic pipe by providing cements and "sweat" couplings for use with the plastic pipe. On the other hand, even this method of making connections is not possible with yet other or prior available plastic pipe because the surface of the pipe, due to the presence of reinforcing fibers therein, is so rough that it is not possible to make a satisfactory cement-type connection between the pipe and a coupling. Obviously, plastic pipe would come into more widespread use and acceptance by the trade if it were not necessary to use special coupling devices and methods to make connections between pipe sections, i.e., if it were possible to connect plastic pipe using standard pipe threading methods and equipment.

OBJECTS

A principal object of this invention is the provision of new forms of fiber reinforced molded plastic articles. Further objects include:

(1) The provision of new types of molding materials for use in forming fiber-reinforced molded plastic articles.

(2) The provision of new methods for the production of molding materials for use in molding fiber-reinforced plastic articles.

(3) The provision of new methods for forming fiber-reinforced plastic articles.

(4) The provision of molded, fiber-reinforced plastic pipe which is of homogeneous structure and which is capable of being mechanically threaded with standard type threading equipment.

(5) The provision of molded, unlined, fiber-reinforced plastic pipe capable of containing water or comparable fluids under continuous hydrostatic pressure up to the bursting strength of the pipe, without any appreciable seepage of liquid through the walls of the pipe.

(6) The provision of new molding materials comprising thermosetting resins and asbestos fibers which may be used on a commercial scale for the formation of plastic pipe or other molded articles, without any appreciable tendency of the molded articles to contain small pin holes or other spots of inhomogeneity which cause the pipe to leak or possess other weaknesses.

(7) The provision of new methods by which molded plastic articles may be formed from suitable proportions of plastic material and reinforcing fibers to create the desired structural and physical properties in the final molded article, without at the same time requiring the need for use of unusual handling or molding equipment or steps which increase the cost of the resulting plastic pipe to a level which is uncompetitive with metal pipe of comparable structural and physical properties.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

GENERAL DESCRIPTION

These objects are accomplished according to the present invention by forming a molding material from a high bulk asbestos paper impregnated with between about 40–65% by weight of a thermosetting resin, heating the impregnated asbestos fiber paper under controlled temperature conditions so as to remove any volatile solvent which may be contained in the paper, and partially curing the thermosetting resin to a semi-solvent thermoplastic state, commonly known as the B-stage. The resulting resin-impregnated paper is substantially dry, self-sustaining and may be handled in sheet form, or may be macerated to form shreds which may be used as a molding material.

Fiber-reinforced plastic pipe having a substantially homogeneous structure with smooth inner and outer surfaces can be formed by rolling the B-stage resin impregnated paper onto a mandrel at room or elevated temperatures, overlapping layers of paper in a convoluted fashion until the desired thickness is obtained and preferably using a slight pressure or tension in the paper in order to properly assemble the paper on the mandrel. The convoluted paper and the enclosed mandrel are then subjected to an elevated temperature and other conditions sufficient to fuse the impregnated resin into a solid matrix and to cure the resin into a thermoset stage, commonly known as the C-stage. This resin fusing and curing operation may be conducted in heated ovens or in other suitable equipment. For oven curing, the convoluted paper and mandrel can be wrapped in a non-fibrous plastic material such as cellophane or polyethylene terephthalate and placed in a heated oven. The plastic covering shrinks slightly, exerting some pressure on the convoluted resin impregnated paper during the curing.

Other fiber-reinforced plastic articles of different shape may be formed by assembling sections of the dry B-stage resin-impergnated asbestos paper upon a suitable form into the general shape desired of the final plastic article, and then subjecting the assembled paper sections to heat and pressure sufficient to mold the assembled paper to the desired final shape, fuse the impregnated resin, and cure it to a thermoset stage. In such operations, sheets of paper may be used in the assembly operation or dry, loose paper shreds formed by maceration of the paper sheets may be employed. Use of the shredded paper as the molding material is preferred where articles having special contours or complicated shapes are to be formed. The macerated resin impregnated paper may be used as a molding material in standard compression molding equipment, particularly for the formation of small size plastic articles.

The molded, unlined plastic pipe formed by the procedures generally outlined above possesses a homogeneous structure, and has both inner and outer surfaces which are smooth. The resulting pipe can be threaded with standard pipe threading equipment, in order to join it to desired pipe coupling elments. Also, since the pipe surfaces are smooth, connection to "sweat-type" couplings can readily be made using suitable adhesive material. Using the paper sheet or shred assembly molding operations as above described, pipe elbows, tees, nipples or the like for use with the new fiber-reinforced plastic pipe may easily be formed without the occurrence of pin holes or other minute openings or cracks in the walls of the pipe or couplings through which fluid could seep when it is contained under pressure within the pipe or couplings.

FLOW DIAGRAM

The accompanying sheet of drawing is a flow diagram of the form suggested by M. O. Wolk in the J.P.O.S., vol. 30, page 368, and graphically illustrates the operations and products of this invention. The flow diagram is designed to present the reader with a concise presentation of the operations and materials involved, but does not attempt, because of space limitations, to designate all of the various details of the new methods and compositions. To obtain these, the reader should refer to the following examples and detailed description.

EXAMPLES

A more complete understanding of the invention may be obtained by reference to the following examples of actual operations carried out in accordance with the invention. In these examples, all parts and percentages are by weight unless otherwise specified.

*Example I*

Several different asbestos papers made of certain particular asbestos fibers and possessing a bulk of at least 0.3 are each impregnated with one of a series of solutions of thermosetting resins. The impregnation of each asbestos paper is accomplished by unwinding the paper from a roll at a controlled speed, passing it over an idler roller into a tank containing the resin solution, withdrawing the paper from the tank, passing it between squeeze rollers to control the amount of liquid saturating material remaining in the paper, passing the solution impregnated paper through an oven maintained under controlled conditions in order to heat the impregnated sheet to a controlled temperature for a controlled period of time to evaporate volatile components from the sheet and partially cure the impregnated resin to a B-stage and, finally, the paper is wound upon a take-up roll. Data concerning the various conditions of operations and characteristics of materials used in these paper saturation operations are as follows:

TABLE 1

| Asbestos Paper | Run #1 | Run #2 | Run #3 |
| --- | --- | --- | --- |
| Asbestos Fiber Identity | 4X Munro | 4X Munro | 4X Munro. |
| Asbestos Fiber Content | 99% | 97% | 97%. |
| Non-fibrous Binder Material | WC-9 | WC-9 | WC-9. |
| Binder Content | 1% | 3% | 3%. |
| Caliper (inches) | 0.010 | 0.0105 | 0.0105. |
| Weight (lbs./100 sq. ft.) | 3.0 | 3.0 | 3.0. |
| Bulk (100×caliper/wt.) | 0.33 | 0.35 | 0.35. |
| Impregnating Solution: | | | |
| Resin Identity | A | B | C. |
| Viscosity | 50 cp | 50 cp | 100 cp. |
| Solvent | None | MEK | Ethanol. |
| Resin Content | 99% | 59.5% | 60%. |
| Solvent Content | None | 27% | 39%. |
| Catalyst Identity | X | Y | |
| Catalyst Content | 1% | 10.5% | |
| Auxiliary Material Identity | None | Carbon black | Dye. |
| Auxiliary Material Content | | 3% | 1%. |
| Saturation Conditions: | | | |
| Speed of Paper (ft./min.) | 1.0 | 1.5 | 1.0. |
| Temperature (° F.) | 130 | 200° | 260°. |
| Time of Heating (min.) | 15 | 10 | 10. |
| Resin Content Final Paper | 56% | 53% | 52%. |

In the above Table 1, the following terms have the following meaning:

4X Munro means a chrysotile asbestos fiber which has been refined to be low in fines so that not more than 30% of the fibers are less than 200 mesh and of the remainder of the fibers, at least 50% are between 28 and 100 mesh size. The fibers further have a Schopper-Riegler freeness of between 500 and 560 and a minimum standard Tappi brightness (wet) of 80.

WC-9 means a polyalkyl acrylate emulsion sold by the Rohm and Haas Co. under the trade name "Rhoplex WC-9."

Resin A means a thermosetting unsaturated polyester resin comprising diallyl phthalate and styrene in ratio of about 80:20.

Resin B means a thermosetting epoxy resin comprising predominately the polyglycidyl ether of 4,4'-dihydroxy diphenyl dimethyl methane.

Resin C means a thermosetting phenolic resin comprising predominately the condensation product of phenol and formaldehyde and including therein a suitable catalyst to effect cure; for example, hexamethylene tetramine.

MEK means methyl ethyl ketone.

Catalyst X means a mixture of equal parts of benzoyl peroxide and methyl ethyl ketone peroxide.

Catalyst Y means m-phenylene diamine.

The dried, impregnated paper rolls obtained in Runs 1 to 3 are conveyed to a wrapping machine where sections of paper from each run are wrapped on polished heated chrome mandrels 2⅛ inches in diameter. The papers are wrapped onto the mandrels with the machine direction of the paper running circumferentially and these assemblies are designated Runs 1A, 2A and 3A. A second series of polished chrome mandrels are wrapped with the papers by rolling the paper onto the mandrels with the machine direction of the paper running longitudinally and these assemblies are designated Runs 1B, 2B and 3B.

The wrapping machine comprises a pair of horizontal driven rolls which are heated and the mandrel rests in the nip between these two rolls. Positioned above the nip of these rolls is a third idler roll carried from a pneumatic cylinder-piston unit which enables the idler roll to be pushed down upon the mandrel and apply pressure to the paper as it is wrapped about the mandrel.

Sufficient paper is wrapped on each mandrel to give a desired thickness, after which the wrapped paper and mandrels are removed from the wrapping machine, wrapped in sheets of cellophane and placed in an oven and heated for a time sufficient to fuse and cure the resin in the paper. The cured pipes are then pulled from the mandrels and trimmed to form finished pipes. Finally, the finished pipes are subjected to several tests to determine the strength and other physical properties of the pipes. The data concerning the pipe forming and the pipe testing operations are reported in the following Table 2.

TABLE 2

| Paper Run | Temp. Rolls, °F. | Temp. Mandrel, °F. | Roll Pressure, p.s.i.g. | Cure Time, hr. | Cure Temp., °F. | Burst Pressure, p.s.i. | Wall Thickness, in. | Burst Tensile, p.s.i. | Radial Weep |
| --- | --- | --- | --- | --- | --- | --- | --- | --- | --- |
| 1A | 175 | 325 | 100 | 1 | 300 | 1,500 | 0.146 | 12,800 | None. |
| 2A | 160 | 300 | 100 | 1 | 300 | 1,350 | 0.130 | 11,800 | Do. |
| 3A | 125 | 260 | 100 | 2 / 3 | 300 / 350 | 1,175 | 0.116 | 12,700 | Do. |
| 1B | 175 | 325 | 100 | 1 | 300 | 800 | 0.117 | 7,500 | Do. |
| 2B | 150 | 250 | 100 | 1 | 250 | 1,350 | 0.143 | 7,200 | Do. |
| 3B | 125 | 260 | 100 | 2 | 260 | 700 | 0.125 | 6,900 | Do. |
| 1A | 80 | 150 | 80 | 1 | 300 | 1,450 | 0.132 | 13,700 | Do. |
| 2A | 155 | 300 | 100 | 1 | 300 | 1,400 | 0.128 | 11,900 | Do. |
| 3A | 125 | 225 | 100 | 2 / 16 | 260 / 300 | 1,800 | 0.121 | 16,700 | Do. |
| 1B | 150 | 300 | 100 | 1 | 300 | 800 | 0.148 | 7,700 | Do. |
| 2B | 150 | 250 | 100 | 1 | 250 | 1,350 | 0.167 | 6,500 | Do. |
| 3B | 110 | 200 | 50 | 1 / 16 | 260 / 300 | 800 | 0.121 | 7,700 | Do. |

The burst pressures reported in Table 2 are obtained according to ASTM D1180–51T by subjecting sections of pipe to increasing hydrostatic pressure until the pipe fails, the hydrostatic pressure at the time of failure being determined in p.s.i. with a suitable pressure gauge in the fluid pressure line.

The hydrostatic burst tensile stress at rupture of the pipe is calculated for each pipe from the burst pressure using the formula $S = Pd/2t$ where S is the tensile stress, P is the internal pressure, $t$ is the wall thickness and $d$ is the outside diameter.

The weep tests are carried out using the hydrostatic burst apparatus, the test pipe being held at 300 p.s.i. for two hours at room temperature. Visual observation of droplets of water indicate radial weep.

*Example II*

Asbestos paper of specific fiber content and properties is impregnated with a phenolic resin using the general impregnation procedure described in Example I. The asbestos paper is made from 4X Munro fiber and contains 97% of such fibers and 3% of "Rhoplex WC–9" acrylic resin binder. The paper has a bulk of 0.3.

The phenolic resin used is a high-temperature phenol-formaldehyde resin sold by American Reinforced Plastics, Inc. as "Resin CTL 91–LD" dissolved in methyl isobutyl ketone (70% resin to 30% solvent). The paper after being passed through the strike-through resin solution tank is carried through vertical drying towers where the impregnated sheet is subjected to circulated air heated at 200° F. for a period of twenty minutes.

The resulting resin-impregnated paper contains 55% B-stage phenolic resin. Sections thereof are rolled on 2" O.D. aluminum mandrels using a tension of 10 p.s.i. on the sheet as wound. The tube rolling machine is operated with a roll pressure of 45 p.s.i. at a mandrel speed of 6 r.p.m. and with rollers and mandrel heated to 240° F. The resulting tubes are cured for one hour at 300° F. in an oven.

The resulting tubes are machined to a wall thickness of 0.060–0.065 in. for use in a thermal battery replacing mica tubes. The tubes perform satisfactorily in the thermal battery being exposed to temperatures of up to 1000° F. for up to five minutes without delamination or blistering.

*Example III*

Asbestos paper having a bulk of 0.3 and containing 99% of 4X Munro asbestos fibers and 1% of "Rhoplex WC–9" binder is impregnated with unsaturated polyester resin, i.e., a mixture of 80 parts of a polyester known as "Laminac 4111" and 20 parts of a polyester known as "Laminac 4119", both of which are more fully explained hereafter, containing 0.5 part of benzoyl peroxide and 0.5 part of methyl ethyl ketone peroxide. The paper is passed through the saturation liquid at a speed of 1 f.p.m. and is then dried and precured in a vertical tunnel drier for twenty minutes at 200° F.

Sections of pipe are made by rolling the resin-impregnated paper onto 2" chrome mandrels at a speed of 6 r.p.m. with the support rolls heated to 240° F. and a pressure of 60 p.s.i. applied through the rubber covered roll carried by air cylinders directly above the mandrel. As soon as the desired wall thickness is built up, the asbestos paper is cut and a section of cellophane sheet is rolled on to cover the wound asbestos paper tube. Then the cellophane covered tube is rolled for ten minutes longer while the temperature of the support rolls is maintained at 240° F. Pressure is released from the tube assembly and it is then placed in an oven and completely cured at 350° F. for ½ hour.

The pipe is subjected to various tests and is found to possess the following properties:

| | |
|---|---|
| Specific gravity | 1.35 |
| Percent water absorption | 0.80 |
| Burst tensile p.s.i. (average) | 11,000 |
| Weeping | none |
| Modulus of rupture p.s.i. | 21,500 |
| Flexural strength p.s.i. | 17,400 |

In the above tests, water absorption is obtained by immersing a weighed sample of pipe in water at 190° F. for seven days. The sample is then removed, wiped dry, and immediately reweighed. From the difference in original and final weight, the percent water absorption is calculated. Flexural strength is determined by center point loading of a 24" span.

In another case, the asbestos paper is impregnated in equipment which permits the paper to be subjected to a vacuum before passing into the impregnation solution. Pipe made from such paper is found to have substantially the same properties as reported above.

In yet another case, the asbestos paper is preheated to 400° F. for five hours before impregnation. Pipe made from such paper is found to be substantially the same in properties as the pipe of the first case.

*Example IV*

Additional papers were made using asbestos fibers different than those taught in the preceding examples. Both Jeffrey 5K04 and Munro 4Y fibers were employed. Several different asbestos papers possessing a bulk of at least 0.30 were made using these fibers combined with cellulosic fibers; the cellulosic fibers totaling 20 percent by weight of the total fiber content. The papers were impregnated with various solutions of thermosetting resins in substantially the same manner as taught above. Data concerning the various conditions of operations and characteristics of materials used in the impregnation processes are as follows:

TABLE 3

| Asbestos Paper | Run #4 | Run #5 |
|---|---|---|
| Asbestos Fiber Identity | 5K04 Jeffrey | 4Y Munro. |
| Asbestos Fiber Content | 78% | 78%. |
| Cellulosic Fiber Identity | Kraft (bleached). | Kraft (bleached). |
| Cellulosic Fiber Content | 19% | 19%. |
| Non-fibrous Binder Material | WC–9 | WC–9. |
| Binder Content | 3% | 3%. |
| Caliper (inches) | 0.03 | 0.03. |
| Weight (lbs./100 sq. ft.) | 3.0 | 3.0. |
| Bulk (100 × caliper/wt.) | 0.35 | 0.35. |
| Impregnating Solution: | | |
|   Resin Identity | C | B. |
|   Viscosity | 100 cp | 50 cp. |
|   Solvent | Ethanol | MEK. |
|   Resin Content | 60% | 59.5%. |
|   Solvent Content | 39% | 27%. |
|   Catalyst Identity | | Y. |
|   Catalyst Content | | 10.5%. |
|   Auxiliary Material Identity | Dye | Carbon black. |
|   Auxiliary Material Content | 1% | 3%. |
| Saturation Conditions: | | |
|   Speed of Paper (ft./min.) | 1.0 | 1.5. |
|   Temperature (° F.) | 200° | 200°. |
|   Time of Heating (min.) | 10 | 10. |
|   Resin Content Final Paper | 52% | 53%. |

*Example V*

Still further asbestos papers were made using yet other types of asbestos fiber, Cape Blue. Molded pipe was made using the blue fiber from both epoxy and phenolic resins. The data concerning the conditions of operation and characteristics of the materials corresponds substantially to Runs #2 and #3 of Example I except for the change in the asbestos fiber used. In Table 4 below these articles are represented by Runs #6 and #7 respectively.

Table 4 represents the test results for the papers produced in Runs #4–#7 described above. In all cases the papers were wrapped onto the mandrels, which consisted of chrome 2.035 in diameter, with the machine direction of the paper running circumferentially.

TABLE 4

| Paper Run | Temp. Rolls, °F. | Temp. Mandrel, °F. | Roll Pressure, p.s.i.g. | Cure Time, hr. | Cure Temp., °F. | Burst Pressure, p.s.i. | Wall Thickness, in. | Burst Tensile, p.s.i. | Radial Weep |
|---|---|---|---|---|---|---|---|---|---|
| 4 | 125 | 260 | 100 | 4 | 325 | | 0.170 | | None |
| 5 | 160 | 300 | { 100 / 0 | 2 / 4 | 325 / 400 } | 1,870 | 0.187 | 11,500 | Do. |
| 6 | 160 | 300 | 100 | 4 | 300 | 2,100 | 0.171 | 14,700 | Do. |
| 7 | 125 | 260 | 100 | { 2 / 3 | 300 / 350 } | 2,100 | 0.171 | 14,700 | Do. |

DETAILED DESCRIPTION

The success of the present invention is due to a large measure to the discovery of a critical difference in behavior of certain specific asbestos papers when they are employed in the formation of fiber-reinforced plastic articles. Generally reinforced thermoset plastic articles tend to be somewhat porous, regardless of the reinforcing fibers or filaments incorporated in the articles unless these reinforcing materials are present in low percentages. Consequently, it has been the rule rather than the exception that unlined, thermoset plastic pipe which is reinforced with asbestos, glass or cellulosic fibers, will exhibit liquid seepage through the walls of the pipe when subjected to hydrostatic pressure. It has now been discovered, however, that if asbestos fibers to be used as the reinforcing elements are first formed into paper having certain defined high bulk characteristics, more fully explained hereinafter, and the paper is next impregnated with a particular amount of thermosetting resin, and the impregnated paper is finally molded under heat and pressure to form a molded article, the weeping problem, i.e., liquid seepage through the walls of the article when the liquid is contained thereby the article under hydrostatic pressure, is substantially eliminated.

The paper to be used in carrying out the new plastic forming operations of the invention is characterized by consisting essentially of asbestos fibers along with a minimum amount of added binding materials or other auxiliary agents and for proposes of this invention will be termed an asbestos paper. Additional fibrous materials, such as cellulosic fibers, may be included in the absestos paper in amounts which do not materially affect the basic and novel characteristics of the paper for purposes of this invention. Thus as seen by the above examples, cellulosic fibers, as illustrated by kraft fiber, may be included in high proportions in the asbestos paper while providing an operable paper usable in producing "non-weeping" molded articles. Accordingly as long as the asbestos paper maintains its high bulk characteristic and its ability to effect "non-weeping" molded articles, it may be so modified. The term asbestos paper as used herein is therefore to be read in that light. Specifically, the paper should be made to consist essentially of 90 to 99% fibers and 1 to 10% of binder material or other auxiliary agents.

The asbestos fibers preferably used in the paper are those which are classified in the trade as "harsh." Harsh asbestos fibers are those which are made from asbestos of the group consisting of chrysotile, crocidolite and amosite. Examples of commercial classes of satisfactory asbestos fibers include 4X Munro and 6D Jeffrey fibers. Preferably, the asbestos fibers to be used in preparing the paper employed in carrying out the procedures of the invention should be refined so that the fibers are low in fines. Thus, the asbestos fibers preferably should be refined so that not more than 30% thereof are less than 200 mesh size, i.e., no more than 30% by weight of the fibers will pass through a standard 200 mesh sieve. The remainder of the fibers may be distributed in any proportion as to size above 200 mesh, but at least about 50% thereof should be of such size as to pass a 28 mesh standard sieve and be retained on a 100 mesh standard sieve.

In addition to the type and size characteristics of the asbestos fibers to be used in forming the paper employed in the invention operation, it has also been found that the asbestos fibers should preferably be well open so that there is contained among the fibers only a relatively small amount of pencils. A "pencil" designates a bundle of asbestos fibers of $\frac{1}{32}$ of an inch or more in diameter. The suitability of asbestos fibers in this regard may be ascertained by the Schopper-Riegler freeness test, and under this test, asbestos fibers to be used in accordance with the invention should have a freeness value of between about 500 to 560. In addition, the fibers should be relatively clean, so that when tested with the standard Tappi brightness (wet) the brightness of the asbestos fiber should not be less than 70.

Most desirable results as regards strength of molded pipe and absence of any weeping in the molded pipe are obtained when paper is used in the described operations formed of asbestos fibers as indicated with a minimum of binder or other added materials, the binder preferably being of a non-fibrous nature. Thus, although it is possible to employ between 1 and 10% of added binder material, is is preferred that this added material be within the range of 3 to 5% by weight of the total weight of the paper. The non-fibrous binder material which is employed in the asbestos paper serves to provide the paper with sufficient wet strength to permit it to be handled and processed in subsequent resin impregnation steps. Various binding materials of this type are known in the art of asbestos paper manufacture and include vinyl resins such as polyvinyl chloride resins, preferably employed in the form of aqueous emulsions, acrylic resins such as the methyl, ethyl, butyl and hexyl esters of acrylic or methacrylic acid, copolymers or mixtures thereof, cellulose ethers or esters, and comparable non-fibrous resin materials which may be employed in asbestos paper to provide cohesive strength to the paper.

In addition to a non-fibrous binder material, the asbestos paper may contain, within the indicated limits, fillers or pigments, e.g., for the purpose of modifying the appearance or color of the paper. Such filler or pigment materials may include titanium dioxide, carbon black, silicon dioxide, rouge, heavy metal pigments, or the like. In some cases, it may be desirable to assemble or laminate the asbestos paper with woven or non-woven webs of other fibers, e.g., lino-weave glass fiber cloth, nylon felt or the like.

The paper to be employed in accordance with this invention, in addition to being made from the above specified fibers, must also be formed to have relatively high bulk. Bulk is defined as the caliper divided by the weight times 100. Caliper is the thickness measured in inches and the weight is measured in pounds per 100 square feet of paper. Asbestos papers to be used in the operations of this invention should have a bulk of at least 0.3, and a bulk between about 0.3 and 0.6 is preferred. It cannot be categorically stated that satisfactory results may not be attained with a paper bulk below 0.30 but it is known that stardard 10 pound commercial asbestos papers with a bulk of 0.22 definitely do not produce satisfactory results and consequently a bulk below about 0.28 would not be commercially recommended.

The exact reason why the specified types of asbestos paper function in the new plastic article forming procedures to produce pipe and other articles which do not exhibit any weeping has not been determined. Presumably, there is some unique cooperation between fibers in this class of paper and the impregnating thermosetting resins which brings about the net result of having the final molded articles possess ultimate high strength characteristics, and at the same time be free of pin holes or other small cracks or openings which would result in liquid seepage through the walls of the molded article. In any event, the use of the specified type of asbestos paper in combination with thermosetting resins makes it possible, in accordance with this invention, to produce fiber reinforced plastic pipe having high structural strength properties without any weeping tendencies and without need to use plastic liners, non-fibrous plastic strata or the like on the inside of the plastic pipe in order to prevent weeping. Furthermore, the use of asbestos paper in the manner specified makes possible the production of pipe and other molded plastic articles which are of substantially homogeneous structure, with the fibers being distributed within the resin matrix in such fashion that the reinforcement material does not interfere with mechanical threading of the pipe using standard threading equipment.

There are a wide variety of different thermosetting resins which may be employed to produce the new molding materials of this invention and to make fiber reinforced plastic articles using the procedures herein described. Furthermore, it is probable that as developments in synthetic resin technology continue, additional thermosetting resins will become available which may be used in the new procedures of the invention.

Those thermosetting resins which have been found to be most satisfactory for use in this invention are those which are referred to in the trade as phenolic resins, unsaturated polyester resins, and epoxy resins.

The phenolic resins are condensation products of a phenol and an aldehyde, e.g., phenol, cresol, p-hydroxy diphenyl or other phenols with formaldehyde, furfural or other aldehydes. Any of the laminating type of phenolic resins which are capable of being cured to a thermoset stage may be used. The preparation and chemical construction of the usable phenolic resins is discussed in "Encyclopedia of Chemical Technology," published 1953 by The Interscience Encyclopedia, Inc., volume 10, pages 335 to 369. Suitable phenolic resins are also disclosed in numerous patents including U.S. 1,126,926, 2,272,155 and 2,736,718.

The unsaturated polyester resins are the esterification products of unsaturated alcohols with polybasic acids or unsaturated acids with mono- or polyhydric alcohols. Such resins are also referred to in the synthetic resin trade as "contact resins," e.g. see "Encyclopedia of Chemical Technology," supra, volume 1, pages 590–591 and volume 10, pages 807 and 808. Specific examples of preferred materials include polymers of diallyl phthalate, diallyl maleate, glycol diacrylate, glycol dimethacrylate, and similar unsaturated polyesters such as disclosed in U.S. Patents 2,501,610, 2,596,162, 2,806,014 and 2,810,712. Commercial products of this type are usually mixtures of the unsaturated polyesters and often include minor amounts of other polymerizable materials, e.g., styrene, divinyl benzene, vinyl acetate, methyl acrylate and the like. The commercial polyester resins sold by American Cyanamid Co. under the trade names "Laminac 4111," "Laminac 4116" and "Laminac 4134" give good results.

The epoxy resins are thermosetting ethoxyline resins of polyglycidyl ethers of polyhydroxy compounds with polybasic carboxylic acid anhydrides or equivalent polyfunctional compounds. The production and chemical construction of usable epoxy resins are disclosed in volume 45, pages 2715 to 2721 of "Industrial and Engineering Chemistry" and the First Supplement (1957) of "Encyclopedia of Chemical Technology," supra, pages 312 to 329. Specific examples of usable epoxy resins are also disclosed in U.S. Patent 2,824,851, 2,863,853, 2,890,196 and 2,890,204. Commercially available epoxy resins which may be used include "Epon 828" and "Epon 892" sold by the Shell Chemical Co.

In order to provide the proper combination of structural strength and absence of weeping in the ultimate molded plastic articles of the invention, the proportion of resin to asbestos paper should be controlled so that the solvent-free resin-impregnated paper which serves as the new molding material of the invention will contain between about 40 and about 65% by weight of resin based on the total weight of resin impregnated paper. It has been found that a resin content less than 40% produces molded articles which tend to weep. On the other hand, use of more than about 65% of resin produces molded articles which tend to be of insufficient tensile and other structural strength.

A small amount of catalyst material should generally be included in the liquid resin impregnating mass used to saturate the asbestos paper. However, some resins as supplied commercially include a catalyst and do not require the addition of catalyst material. The exact amount of catalyst used can be varied and will depend to some extent upon the specific catalyst employed as well as the particular thermosetting resin which is used. The preferred impregnating resin solutions will employ, however, between about 0.1 to 10% by weight based upon the weight of the thermosetting resin of catalyst material and between about 0.5 and 5% by weight is especially effective.

Many different types of catalysts are available and are usable in accordance with the invention, with the various types of thermosetting resins which may be employed. Useful catalysts for phenolic resins include oxides or hydroxides of sodium or other alkali metals and ammonia; calcium or other alkaline earth metals; zinc, aluminum; amine such as ethylene diamine, aniline, cyclohexyl amine; quaternary ammonium bases, e.g., tetranethyl ammonium hydroxide, methyl pyridium chloride or the like and mixtures of such compounds.

Useful catalysts for unsaturated polyesters resins include organic peroxides such as benzoyl peroxide, acetyl peroxide, lauroyl peroxide, methyl ethyl ketone peroxide, tertiary butyl hydroperoxide, stearyl peroxide, cumene hydroperoxide, caprylyl peroxide; heavy metal salts, e.g., copper or cobalt linoleates and naphthenates; azo compounds, e.g., azobisisobutyronitrile, methyl azoisobutyrate and mixtures of such materials.

Useful catalysts for epoxy resins include amines, e.g., m-phenylene diamine, ethanoldiamine, dialkyl amino propylamine, triethylamine, piperidine, and the like, amides, e.g., formamide, phthalimide, succinyl diamide; acid anhydrides, e.g., phthalic anhydride, pyromellitic dianhydride, maleic anhydride; sulfones, e.g., diamino diphenyl sulfone, and mixtures of such or equivalent materials.

The new molding materials of the invention composed of asbestos paper impregnated with a B-stage thermosetting resin do not possess unlimited shelf life, i.e., if the materials are maintained at room temperature for several days or more, the resin content may undergo some transformation toward the C—stage, which may tend to render the subsequent molding of the materials unsatisfactory. The molding materials made from unsaturated polyester resins and epoxy resins have been found to have less shelf life than those made from phenolic resins. The keeping qualities of the molding materials may be extended by storing these products under refrigeration. However, another method of extending the shelf life of the molding material has also been developed. This is attained by using special catalyst mixtures in forming the resin-impregnated asbestos papers of the invention. Such catalyst mixtures consist of a catalytic material effective to produce a partial curing only of the thermosetting resin at a temperature below about 200° F., plus another catalyst which is not as active in curing the resin at temperatures below 200° F., but effective at temperatures above about 200° F., to completely cure the resin to a thermoset stage. The one component of the catalyst mixture permits the resin impregnated in the asbestos paper to be partially cured to a B-stage, without tendency for the resin to be undesirably polymerized or condensed toward the final thermoset stage prior to the final molding operation. A mixture of equal parts of benzoyl peroxide and methyl ethyl ketone peroxide for use with unsaturated polyester resins is an example of this type of catalyst system. Sheets of asbestos paper impregnated from a solvent solution of an unsaturated polyester resin, such as diallyl phthalate polymer, may be precured using 1% of such catalyst mixture for about 15–30 minutes at 130° F. to form dry, solvent-free resin impregnated sheets. With such precure conditions, the methyl ethyl ketone peroxide component of the catalyst apparently causes polymerization of the resin to a B-stage. This molding material can then be given a final cure at 300° F. for about ½ to 1 hour, during which the impregnated resin suitably fuses and is activated to a thermoset stage by the action of the benzoyl peroxide. Further examples of such two-stage, delayed action catalyst systems include: sodium hydroxide and sodium phenolate, or calcium oxolate and p-phenylene diamine for phenolic resins; benzoyl peroxide and tert.-butyl hydroperoxide for unsaturated polyester resins; maleic anhydride and adipic acid or phthalic anhydride and phthalimide for epoxy resins.

In forming the resin impregnating solutions for saturation of the asbestos paper, volatile solvents may be employed to obtain a desired viscosity in the impregnating solution if the thermosetting resin per se does not have the desired viscosity. On the other hand, it is also possible to obtain an adjustment of viscosity of the impregnating solution by mixing together two or more portions of thermosetting resin which possess different viscosities so that the final resin mixture will have a viscosity which will be most effective in saturating the asbestos paper to a degree that after the impregnated paper has been precured to advance the impregnated resin to the B-stage, the paper will contain the above desired 40 to 65% by weight of resin. Obviously, if the impregnating solution is too thin, it will not be possible for the paper to retain enough of the impregnant during the handling following impregnation to permit the proper resin content to be obtained. Conversely, if the impregnating solution is too viscous, it is not possible effectively to impregnate the paper with the required amount of resin. It has been found that impregnating solutions with viscosities between about 50 and 100 centipoises as measured by Gardner-Holt viscosimeter produce the best results.

When a volatile solvent is used to form impregnating solutions of desired viscosity from the thermosetting resins, it is preferable to use solvents which will dissolve the thermosetting resins, having a boiling point below 250° F. and particularly, with boiling points between about 80 and 200° F. Examples of usable solvents include methyl, ethyl and butyl alcohols, benzene, toluene, acetone, methyl ethyl ketone, methyl isobutyl ketone, ethylene dichloride, carbon tetrachloride, ethyl acetate and other volatile organic solvents of comparable solvent power and evaporation rate. The amount of solvent employed in forming the impregnating solutions will depend primarily upon the viscosity of the thermosetting resin used with the solvent in forming the impregnating mass. Up to 50% by weight based upon the total weight of impregnating solution, may be employed with thermosetting resins of high viscosity. More commonly between about 5 to 20% by weight of volatile solvent will be used.

The impregnation of the asbestos paper with the thermosetting resin can be carried out in any suitable type of equipment. Impregnation tanks, padding units, doctor-blade units, roller coating units, spraying devices or the like may be employed. Regardless of the equipment used, the saturation operation should be conducted under such conditions that sufficient of the impregnating resin mass will be incorporated in the asbestos paper to leave a solid resin content of between about 40 and 65% by weight after all volatile solvents have been removed from the impregnated paper.

Following impregnation of the paper with the thermosetting resin, the impregnated sheets are subjected to conditions effective to remove all volatile organic solvents and like components from the sheets and partially transform the impregnated thermosetting resins to a B-stage. Ovens or tunnel dryers heated by steam, infrared ray or induction heating are satisfactorily employed for this purpose.

The conditions used for treatment of the impregnated asbestos papers in order to produce the new molding materials of the invention can be varied and will be dependent in part upon the thermosetting resin employed for impregnation of the paper. Phenolic resins generally require more severe conditions of temperature and time than the epoxy resins or polyester resins. Furthermore, the time of treatment in any given temperature will depend to some extent upon the amount of solvent which is contained in the saturating resin solution. However, for the preferred impregnating thermosetting resin masses as above described, temperatures of between about 100 and 200° F. applied for periods of from 5 to 60 minutes are generally most suitable in forming the new molding materials from the thermosetting resin impregnated asbestos papers.

As a result of the precuring operations just described, there can be produced resin impregnated papers which are self-sustaining, substantially dry, and which can be assembled in roll form for subsequent use. Such resin impregnated papers may be bound upon mandrels to form tubular sections of suitable thickness, from which fiber-reinforced plastic pipes may be produced by suitable molding operations. Similarly, sections of the paper sheets may be assembled on suitable forms and subsequently subjected to molding conditions to create molded articles of various configurations such as elbows, T's, nipples or the like for use as couplings with the long sections of plastic pipe which may be molded from the resin impregnated sheets on cylindrical mandrels. Forms made of low melting point metal alloys can be advantageously used in such molding operations, since after the assembled resin-impregnated paper has been formed into a molded article using suitable curing conditions, the metal form may be removed by heating the assembly to a temperature above the melting point of the metal mold, and thus permitting the metal to be poured from the molded plastic article. On the other hand, and particularly in the case of the molding of small plastic articles or articles of special contours or shapes, the paper sheets may be macerated in order to form shreds, and these shreds may then be forced under pressure into suitable mold cavities to form desired shaped articles by well-known compression molding operations.

It is possible to carry out the final molding and curing of the new resin-impregnated asbestos papers of this invention without the use of pressure. However, most satisfactory results are obtained when some elevated pressures are applied to the molding material during the curing operation. In those cases where sections of plastic pipe are to be formed, satisfactory pressure can be obtained by encasing the mandrel and the asbestos paper wound thereon within an envelope of cellophane, polyethylene terephthalate, or similar materials which will shrink slightly under the curing conditions to apply a slight pressure to the convoluted paper. Similarly, any other suitable method of applying pressure and heat to the assembled resin-impregnated paper sections may be employed. Ordinarily, a temperature of at least 300° F. applied for at least one hour will be used to cure the assembled molding material. More specifically, curing conditions of 300 to 500° F. applied for 1 to 24 hours may be employed at pressures of, for example, 1 to 500 pounds per square inch. The curing of the assembled molding materials may be carried out in several different stages, e.g., the initial curing may be conducted at super-atmospheric pressures, while a longer and extended curing may follow atmospheric pressure. This is particularly useful in connection with molding materials made from phenolic resins which generally require longer periods of time for complete curing.

If difficulties are encountered in removing the mandrels or other forming devices from the molded plastic articles, mold release agents may be employed to mitigate these difficulties. As is known in the art, the mold release agents may be incorporated in the molding material or may be applied as a film to the mandrel or other forming devices. Heavy metal salts of fatty acids, graphite, silicone resins, high molecular weight fluorocarbons or similar mold release agents may be employed for this purpose.

CONCLUSIONS

In the foregoing specification, there are disclosed new methods for making fiber-reinforced plastic pipe and other fiber-reinforced plastic articles, along with a description of the procedures which may be used to form molding materials to be used in making the plastic pipe and plastic articles. These new molding operations are distinguished by the fact that they produce fiber-reinforced plastic structures which are substantially homogeneous in construction, and yet which contain at least 35 to 60% by weight of reinforcing fibers. At the same time, the new plastic articles are substantially free of any tendency to weep, i.e., to seep liquid through the walls of the article when the liquid is contained under substantial hydrostatic pressure within the molded plastic structure. Plastic pipe, pipe couplings or other articles made in accordance with the procedures as described may be subjected to hydrostatic pressures of at least 600 p.s.i. at room temperature indefinitely without any signs of weeping, and furthermore can withstand pressure of 300 p.s.i. for at least 24 hours at 200° F. Likewise, these new plastic articles are resistant to high temperatures, i.e., they can withstand temperatures of about 1000° F. for at least five minutes without blistering or delamination. Another noteworthy aspect of the new molding operations is the fact that the plastic pipe made thereby can be threaded with standard pipe threading equipment and procedures and does not require the use of special couplings or special molding operations in order to create a fluid-tight joint between the section of the plastic pipe and a pipe coupling.

Having provided a complete description of the invention in such manner as to distinguish it from other inventions and from what is old, and having provided a description of the best mode contemplated of carrying out the invention, the scope of patent protection to be granted the invention is defined by the following claims.

What we claim is:

1. A method of making a molding material for use in forming fluid opaque fiber reinforced molded plastic articles comprising providing an asbestos paper having a bulk greater than 0.28, consisting essentially of 90 to 99% by weight fibers and 1 to 10% non-fibrous binding material, said fibers consisting essentially of asbestos fibers, impregnating said paper with a thermosetting resin to provide an impregnated paper containing about 40 to 65% by weight resin and heating the thus impregnated paper to polymerize the resin to a B-stage whereby a resin impregnated asbestos paper containing about 40 to 65% by weight thermosetting resin is obtained.

2. A method as claimed in claim 1, wherein said paper is macerated to form a mass of dry, loose, resin-impregnated asbestos paper shreds.

3. A method as claimed in claim 1, wherein said thermosetting resin impregnating material comprises two curing catalysts, one of said catalysts being effective to produce a partial curing only of the resin, at a temperature below 200° F. and the other of said catalysts being relatively ineffective at temperatures below 200° F. and effective at temperatures above about 200° F. to completely cure said resin to a thermoset stage.

4. Material for use in forming fiber-reinforced molded plastic articles which are fluid opaque, which material consists essentially of asbestos fiber paper free of volatile solvents and impregnated with between about 40 and about 65% of a thermosetting resin material partially cured to a B-stage, said paper prior to impregnation having a bulk greater than 0.3 and consisting essentially of 90 to 99% by weight of fibers and 1 to 10% of non-fibrous water insoluble binder material, said fibers consisting essentially of harsh asbestos fibers and being of a size such that at least 70% by weight of the fibers are retained on a 200 mesh sieve and about 50% by weight of said retained fibers are retained on a 100 mesh sieve.

5. A material as claimed in claim 4 wherein said thermosetting resin is an epoxy resin.

6. A material as claimed in claim 4 wherein said thermosetting resin is an unsaturated polyester resin.

7. A material as claimed in claim 4 wherein said asbestos fibers have a Schopper-Riegler freeness of between about 500 and 560 and a Tappi brightness of at least 80.

8. A material as claimed in claim 4 wherein said non-fibrous binder material is a water insoluble acrylic ester polymer.

9. A material as claimed in claim 4 in the form of dry, loose paper shreds.

10. A material as defined in claim 4 wherein said fibers of said paper consist of 80% by weight of asbestos fibers and 20% by weight of cellulosic fibers.

11. A molded fiber reinforced plastic article which is fluid opaque, comprising sections of asbestos fiber paper fixed in a matrix of thermoset synthetic resin, the resin constituting between about 40 and about 65% by weight of the article with the remainder thereof being said asbestos paper, said asbestos paper being composed of at least 90% by weight of reinforcing fibers consisting essentially of asbestos fibers, said asbestos fibers being harsh asbestos fibers of a size such that at least 70% by weight of the fibers are retained on a 200 mesh sieve and 50% by weight of said retained fibers are retained on a 100 mesh sieve.

12. A method of making fiber reinforced plastic articles, which method comprises providing an asbestos fiber paper having a bulk greater than 0.3, consisting essentially of 90 to 99% by weight of harsh asbestos fibers and 1 to 10% by weight of non-fibrous binding material, said harsh asbestos fibers being of a size that at least 70% by weight of the fibers are retained on a 200 mesh sieve and about 50% by weight of said retained fibers are retained on a 100 mesh sieve, impregnating said paper with a volatile solvent solution of a thermosetting resin to provide resin content of the impregnated paper between about 40 and 65% by weight, heating the impregnated paper to evaporate all solvent from the paper and polymerize the resin to a B-stage, assembling sections of the resulting dry resin impregnated asbestos paper in the general shape desired for the final plastic article, and then subjecting the assembled paper sections to heat and pressure sufficient to mold the assembled paper sections to the desired final shape and to cure the impregnated resin to a thermoset stage.

13. A method as claimed in claim 12 wherein said paper after heating is macerated to form loose resin-impregnated shreds which are subsequently subjected to said assembling and molding steps.

14. Material for use in forming fiber-reinforced molded plastic articles which are fluid opaque, which material consists essentially of asbestos fiber paper free of volatile solvents and impregnated with between about 40 and about 65% of a thermosetting resin material partially cured to a B-stage, said paper prior to impregnation having a bulk greater than 0.3 and consisting essentially of 90 to 99% by weight of fibers and 1 to 10% of non-fibrous water insoluble binder material, said fibers consisting essentially of harsh asbestos fibers.

15. A molded fiber reinforced plastic article which is fluid opaque, comprising sections of asbestos fiber paper fixed in a matrix of thermoset synthetic resin, the resin constituting between about 40 and about 65% by weight of the article with the remainder thereof being said asbestos paper, said asbestos paper being composed of at least 90% by weight of reinforcing fibers consisting essentially of asbestos fibers, said asbestos fibers being harsh asbestos fibers.

References Cited by the Examiner

UNITED STATES PATENTS

| | | | |
|---|---|---|---|
| 1,295,230 | 2/1919 | Stevenson | 117—140 |
| 2,152,901 | 4/1939 | Manning | 154—33 XR |
| 2,209,547 | 7/1940 | Whiteacre | 138—141 |
| 2,315,217 | 3/1943 | Obiglio | 156—184 |
| 2,367,844 | 1/1945 | Cuno | 138—145 XR |
| 2,710,026 | 6/1955 | Stewart et al. | 138—141 |
| 2,711,982 | 6/1955 | Straka | 154—83 |
| 2,795,241 | 6/1957 | Caldwell et al. | 154—83 XR |
| 2,801,945 | 8/1957 | Rogers et al. | 154—83 |
| 2,852,368 | 9/1958 | Steck et al. | 117—140 XR |
| 2,952,040 | 9/1960 | Phillips | 117—140 |
| 2,962,414 | 11/1960 | Arledter | 161—165 |
| 2,976,889 | 3/1961 | Cannady | 138—141 |
| 3,013,916 | 12/1961 | Boiney et al. | 154—43 |
| 3,054,428 | 9/1962 | Crawford | 138—141 |
| 3,067,077 | 12/1962 | Latella et al. | 154—43 |

FOREIGN PATENTS 707,946   4/1954   Great Britain.

EARL M. BERGERT, *Primary Examiner.*

CARL F. KRAFFT, *Examiner.*